United States Patent [19]
Johnson et al.

[11] Patent Number: 6,149,808
[45] Date of Patent: Nov. 21, 2000

[54] DISPOSABLE PAINT STRAINER

[75] Inventors: Douglas A. Johnson; Angela M. Johnson, both of Farmington, Minn.

[73] Assignees: Douglas Johnson; Angela Johnson, both of Farmington, Minn.

[21] Appl. No.: 09/277,365

[22] Filed: Mar. 26, 1999

[51] Int. Cl.[7] .................................................. B01D 35/05
[52] U.S. Cl. ................. 210/242.1; 210/359; 222/189.06
[58] Field of Search .................................. 210/780, 232, 210/242.1, 359; 222/189.06; 239/575

[56] References Cited

U.S. PATENT DOCUMENTS

| | | |
|---|---|---|
| 282,093 | 7/1883 | Kribs . |
| D. 304,670 | 11/1989 | Johnson ........................................ D8/71 |
| D. 362,804 | 10/1995 | Warren ........................................ D9/436 |
| 642,787 | 2/1900 | Eakin . |
| 690,828 | 1/1902 | Brown . |
| 831,232 | 11/1906 | Kreiner . |
| 1,621,413 | 3/1927 | James . |
| 1,955,308 | 4/1934 | Naftel et al. . |
| 2,015,087 | 9/1935 | Rafton ........................................ 209/403 |
| 2,149,227 | 2/1939 | Olson et al. ................................ 221/28 |
| 2,250,646 | 7/1941 | Metsch . |
| 2,527,531 | 10/1950 | Cates, Jr. .................................. 261/119 |
| 2,565,774 | 8/1951 | Maud ........................................ 209/389 |
| 2,625,270 | 1/1953 | De Armas . |
| 3,814,258 | 6/1974 | Ayres ........................................ 210/359 |
| 3,846,077 | 11/1974 | Ohringer .................................... 23/259 |
| 4,025,435 | 5/1977 | Shea .......................................... 210/250 |
| 4,066,557 | 1/1978 | Banoczi ..................................... 210/470 |
| 4,105,564 | 8/1978 | Whelan ..................................... 210/497 |
| 4,290,888 | 9/1981 | Gartmann et al. ....................... 210/356 |
| 4,294,701 | 10/1981 | Whelan ................................. 210/497.2 |
| 4,299,340 | 11/1981 | Hrytzak ................................... 222/189 |
| 4,362,624 | 12/1982 | Ueda ..................................... 210/497.2 |
| 4,613,439 | 9/1986 | Fuhs ........................................ 210/471 |
| 4,622,146 | 11/1986 | O'Brien .................................. 210/469 |
| 4,662,146 | 5/1987 | Parry ........................................ 52/745 |
| 4,804,470 | 2/1989 | Calvillo et al. .......................... 210/232 |
| 4,816,148 | 3/1989 | Hemman .................................. 210/256 |
| 4,853,126 | 8/1989 | Whelan ..................................... 210/469 |
| 5,059,319 | 10/1991 | Welsh ...................................... 210/232 |
| 5,368,728 | 11/1994 | Reaves ..................................... 210/232 |
| 5,935,435 | 8/1999 | Hasler . |

FOREIGN PATENT DOCUMENTS 1163667  9/1969  United Kingdom .

*Primary Examiner*—Duane Smith
*Assistant Examiner*—Fred Prince

[57] ABSTRACT

A strainer for paint, or other liquid products, used for treating or finishing a surface. The strainer including a screen which is secured to a body having an open top, an open bottom and a sidewall. The screen being secured across the open bottom of the body to separate lumps and foreign matter from the paint. The body independently suspends the screen within the paint creating a reservoir of strained paint.

1 Claim, 2 Drawing Sheets

DISPOSABLE PAINT STRAINER

BACKGROUND OF THE INVENTION

The present invention pertains to straining paint, or other liquids, within a container that is used for treating or finishing a surface. More particulary, the invention pertains to a disposable paint strainer.

When applying paint, varnish, stain or some other type of liquid to a surface, it is important to ensure that the paint contains no contaminates, impurities, lumps, or other undesirable elements. Even after proper mixing of the paint these undesirable elements may exist. These undesirable elements prevent proper application of the liquid to the surface and result in blemishes, inconsistent shading or coloring, and other defects. Additionally, excess paint on the brush or applicator makes even application of the paint onto the surface more difficult. It also results in the paint dripping or running along the surface and detracting from the appearance of the finished product as well as increasing the amount of clean up.

To ensure the paint is free of these undesirable elements, one technique is to pour the paint from one container through a strainer and into another container. This technique or type of strainer is disclosed in U.S. Pat. Nos. 5,368,728; 5,059,319; 4,853,176; 4,804,470; 4,622,146; 4,362,624; 4,294,701; 4,290,888; 4,105,564; 4,025,435; and Des. 367,804. This technique increases the risk of spilling the paint, which requires additional clean-up and wastes the spilt paint. Additionally, unless all of the paint is used during an application, any leftover strained paint will have to be returned to the resealable paint can from the strained paint container for storage purposes. This further requires that the user ensure that the resealable paint can is properly maintained during use to prevent contaminants or dry paint from accumulating therein and farther contaminating the paint once it is returned to the paint can.

Contaminants may also enter the container of strained paint during use requiring the user to again pass the paint through the strainer to remove the undesirable elements from the paint. This effectively requires the user to start over and increases the amount of clean up and the risk of spilt paint. This technique also does not allow for controlling the amount of paint being placed on the applicator or brush when it is dipped into the container to avoid excessive paint on the applicator.

A second technique overcomes the shortcoming of having to use multiple containers to strain the paint and is disclosed in U.S. Pat. No. 4,066,557. One manner of this technique secures a strainer within the paint can by a suspension device. Another manner utilizes multiple strainers that are passed through the paint within the container.

The first manner of attaching and suspending the paint strainer in the paint can requires that the strainer or suspension system be sized to fit a specific size of paint can. The suspension system for the strainer must also be capable of adjustment as the amount of paint in the can decreases. Thus, the user has to constantly set up and adjust the suspension system for and during each use.

The second manner of straining paint in a single container uses a strainer which is placed into the container, or paint can, and then pushed to the bottom of the container. The contaminants or impurities are trapped beneath the strainer as it is pushed to the bottom of the paint can. This manner of straining paint requires the strainer to be flexible to fit within the inner diameter of the opening in the paint can, yet be able to expand outward to the inner diameter of the can, which generally has a larger diameter, once inside. The strainer must also have sufficient rigidity so as not to collapse when pushed to the bottom of the can. This technique requires multiple strainers to be used and ultimately placed at the bottom of the can each time the paint within the can is being used.

Multiple strainers at the bottom of the paint creates the possibility that the material used to make the strainer could either break down or react with the paint causing contamination of the paint. Strainers left at the bottom of the paint can wastes paint and creates a greater burden in disposal of the paint can due to trapping paint beneath the stainers which must be dried and hardened prior to disposal. Further, this technique does not limit the amount of paint received on the applicator or brush when it is dipped into the paint can.

Thus, there is no disposable paint strainer which independently floats atop the paint surface to create a reservoir of strained paint and which also limits the amount of paint provided to the applicator.

SUMMARY OF THE INVENTION

The invention is a device and method for straining paint, or other liquid products, used in treating or finishing a surface. The device comprises a body and a screen, wherein, the body has an open top, an open bottom and a sidewall. The screen is secured to the body across the open bottom to separate lumps and foreign matter from the paint. The body independently suspends the screen in the paint creating a reservoir of strained paint which limits the amount of paint provided to the applicator for application onto the surface.

DETAILED DESCRIPTION

Figure 1:
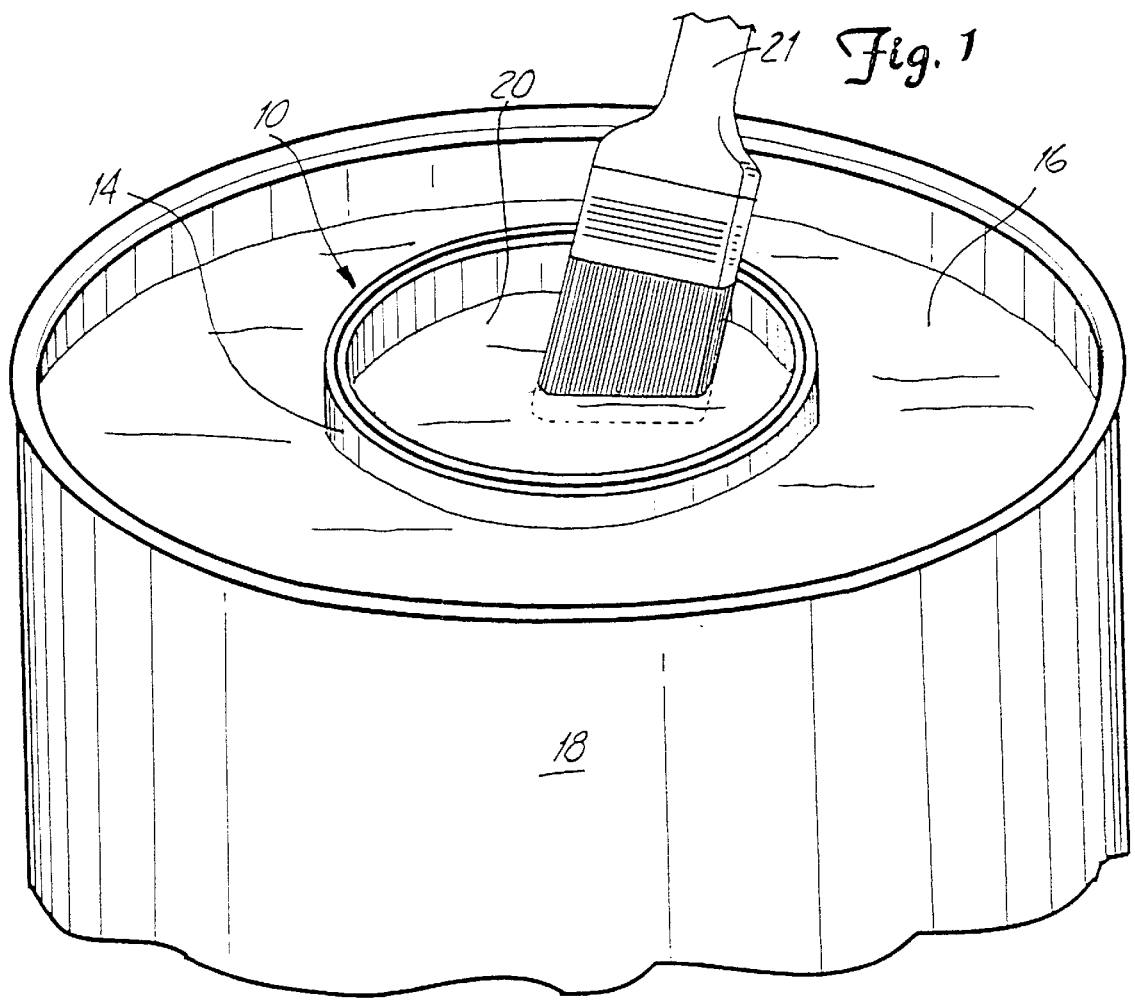
FIG. 1 is a perspective view of a preferred embodiment of the invention placed within a can of paint.

A preferred embodiment of a disposable paint strainer 10 is shown in FIG. 1. The paint strainer 10 is comprised of a screen 12 (shown in FIG. 2) and a body 14. The paint strainer 10 is placed within a quantity of paint 16 contained within a can 18 after the paint 16 has been properly stirred and is well mixed. The body 14 independently suspends the paint strainer 10 within the mixed paint 16. A reservoir 20 of strained paint 16 is then contained within the body 14 for application onto the surface being treated or finished by a paint brush 21.

Figure 2:
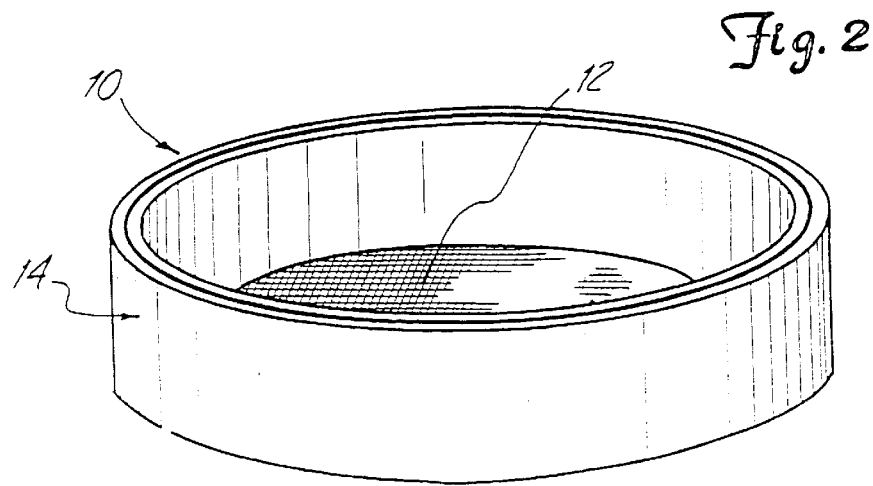
FIG. 2 is a perspective view of a preferred embodiment of the invention.

In FIG. 2, the screen 12 is more clearly shown. The screen 12 is secured to the body 14 so as to separate lumps and foreign matter from the paint 16 as the paint strainer 10 is immersed into the paint 16 creating the reservoir 20 of strained paint 16. The screen 12 can be either a piece of nylon mesh, metal screen, perforated plastic, or other material capable of filtering out lumps or foreign matter in the paint 16. The material used to create the screen 12, however, must be compatible with the paint 16 or other substance contained within the can 18. The paint 16 could be a latex, oil-base, or enamel type of paint. Additionally, the paint 16 could also be a primer, stain, varnish, or some other type of liquid product. The degree of filtering the screen 12 performs will be dependent upon the type of paint 16 contained within the can 18. The thicker the paint 16, the more coarse the filtering by the screen 12. Conversely, the thinner the paint 16, the more fine the filtering by the screen 12.

The body 14 is preferably a cylinder having a diameter which is less than a diameter of the opening of the can 18. This allows the paint strainer 10 to fit within an opening of the can 18 and be set into the paint 16. The body 14 can be made from either cardboard or other form of paperboard, plastic, cork, some form of wood such as balsam wood, sheet metal, or other suitable material. However, the net density of the body 14 should be less than that of the paint 16 so that the paint strainer 10 remains buoyant or floats atop the surface of the paint 16. As an example, cardboard works well in an enamel based paint.

The screen 12 is secured to the body 14 so that when the paint strainer 10 is partially submerged into the paint 16, paint 16 passes through the screen 12 creating the reservoir 20 of filtered or strained paint 16 contained within the body 14 and above the screen 12. The depth the paint strainer 10 is submerged into the paint 16 is primarily dependent on the density of the body 14 as compared to the density of the paint 16. Preferably, the depth that the paint strainer 10 is submerged is set by the user pushing the paint strainer 10 into the paint 16 to a desired level. The paint strainer 10 is preferably submerged about one quarter inch to about one half inch into the paint 16. By submerging the paint strainer 10 this amount, the paint strainer 10 will also help prevent excess paint 16 from gathering on the applicator, such as a paintbrush, when it is placed into the paint can 18 for application on to a surface. Limiting the amount of paint 16 placed on the applicator will help prevent against dripping or running of paint 16 during application avoiding additional cleanup or detracting from the appearance of the finished surface.

Figure 3:
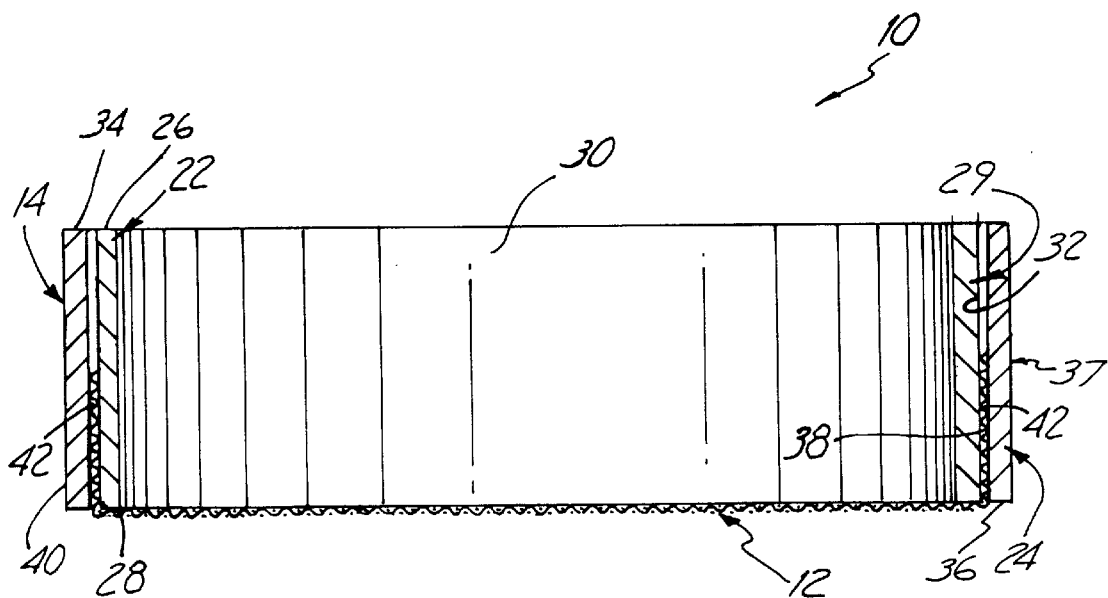
FIG. 3 is a sectional view of a preferred embodiment of the invention.

In FIG. 3, a preferred embodiment of the paint strainer 10 is shown in a sectional view. As shown in FIG. 3, the body 14 is comprised of a first cylinder 22 and a second cylinder 24 The first cylinder 22 includes an open top 26, an open bottom 28, and a sidewall 29 having an inner surface 30 and an outer surface 32. The second cylinder 24 includes an open top 34, an open bottom 36, and a sidewall 37 having an inner surface 38 and an outer surface 40.

In a preferred embodiment, a diameter of the inner surface 38 of the second cylinder 24 is slightly larger than a diameter of the outer surface 32 of the first cylinder 22. The first cylinder 22 thus fits snugly and can be held by compression within the second cylinder 24. The screen 12 is sized to fit across the open bottom 28 of the first cylinder 22 and has an outer edge 42 which contacts the outer surface 32 of the first cylinder 22 along an edge adjacent to the open bottom 28.

Once the screen 12 is placed across the bottom 28 of the first cylinder 22, the bottom 28 is placed in the top 34 of the second cylinder 24. By so doing, the outer edge 42 of the screen 12 is captured between the outer surface 32 of the first cylinder 22 and the inner surface 38 of the second cylinder 24. The first cylinder 22 is then slid within the second cylinder 24 until the bottom surfaces, 28 and 36, as well as the top surfaces, 26 and 34, of the first and second cylinders, 22 and 24, respectively, are aligned Aligning the first and second cylinders 22 and 24 in this manner will pull and secure the screen 12 taunt across the bottom 28 of the first cylinder 22.

Other techniques to secure the screen 12 to the body 14 can also be used. These methods include using an adhesive, stitches, staples, or other similar techniques. The second cylinder 24 could also be replaced by a band which could be used to secure the screen 12 to the first cylinder 22.

In one preferred embodiment, the first cylinder 22 is a cardboard tube having a length of about one and one half inches, an outside diameter of about four and three quarter inches and a wall thickness of about one eighth inch. The second cylinder 24 is a cardboard tube having a length of about one and one half inches, an outside diameter of about five inches and a wall thickness of about one eighth inch. Screen 12 is made of nylon mesh and has a generally circular shape with about a six inch diameter.

While the body 14 has been shown as cylinders 22 and 24, other shapes could be used as well to create the boundaries for the reservoir 20 of strained paint. While the paint strainer 10 has been described as being disposable, it could also be cleaned and reused if desired. Alternatively, a new or clean screen 12 could also be secured to the body 14 after each use.

Although the present invention has been described with reference to preferred embodiments, workers skilled in the art will recognize that changes may be made in form and detail without departing from the spirit and scope of the invention. The material used to construct the screen as well as the degree of filtering it provides can be adjusted as needed for the type of paint or other liquid product being used. Furthermore, the material used to construct the body as well as the shape of the filter can be varied. The body could also incorporate a floatation device such as a floatation pod or pillow to maintain the buoyancy of the device despite the density of the paint. By use of the disposable paint strainer, a self-contained paint strainer that is easy to use and disposable is provided.

What is claimed:

1. A strainer for paint, the strainer comprising:

a first cylinder having an open top, an open bottom, and a sidewall with an inner and an outer surface;

a screen which covers the bottom of the first cylinder and includes an outer edge which overlaps at least a portion of the outer surface of the sidewall adjacent the open bottom of the first cylinder and a second cylinder having an open top, an open bottom and a sidewall with an inner and an outer surface, wherein a diameter of the inner surface of the sidewall of the second cylinder is slightly larger than a diameter of the outer surface of the sidewall of the of the first cylinder so that the first cylinder is held by compression within the second cylinder and the outer edge of the screen is captured between the outer surface of the sidewall of the first cylinder and the inner surface of the sidewall of the second cylinder to create a reservoir which is within the inner surface of the sidewall of the first cylinder and above the screen;

the first and second cylinder and screen having a combined net density less than that of the paint wherein the first and second cylinder allow the strainer to be partially submerged in the paint and provide buoyancy to the strainer such that the open top of the first cylinder and the open top of the second cylinder remain above a top surface of the paint.

* * * * *